US008199721B2

(12) United States Patent
Jung et al.

(10) Patent No.: US 8,199,721 B2
(45) Date of Patent: Jun. 12, 2012

(54) METHOD AND SYSTEM FOR SELECTING RELAY STATION IN A COMMUNICATION SYSTEM

(75) Inventors: Young-Ho Jung, Suwon-si (KR); Yung-Soo Kim, Seongnam-si (KR); Cheol-Woo You, Seoul (KR); Tak-Ki Yu, Suwon-si (KR); Sang-Min Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 786 days.

(21) Appl. No.: 11/848,600

(22) Filed: Aug. 31, 2007

(65) Prior Publication Data

US 2008/0056174 A1 Mar. 6, 2008

(30) Foreign Application Priority Data

Aug. 31, 2006 (KR) .................. 10-2006-0083458

(51) Int. Cl.
*H04W 4/00* (2009.01)
(52) U.S. Cl. ........................................ 370/332
(58) Field of Classification Search ............ 370/310, 370/332, 312, 331, 315, 333, 310.2, 328; 455/452.2, 456.6
See application file for complete search history.

(56) References Cited

U.S. PATENT DOCUMENTS

| 6,161,014 | A * | 12/2000 | Girardeau et al. ............ 455/436 |
| 7,295,850 | B2 * | 11/2007 | Pedersen ....................... 455/515 |
| 7,388,838 | B2 * | 6/2008 | Abraham et al. ............. 370/235 |
| 7,539,207 | B2 * | 5/2009 | Frederiksen et al. ......... 370/465 |
| 7,684,762 | B2 * | 3/2010 | Ihm et al. ........................ 455/69 |
| 7,933,236 | B2 * | 4/2011 | Wang et al. .................... 370/328 |
| 7,986,680 | B2 * | 7/2011 | Kim et al. ...................... 370/341 |
| 2002/0080736 | A1* | 6/2002 | Furukawa ..................... 370/328 |
| 2004/0142698 | A1* | 7/2004 | Pietraski ..................... 455/452.2 |
| 2004/0242154 | A1 | 12/2004 | Takeda et al. |
| 2004/0266339 | A1* | 12/2004 | Larsson ............................ 455/7 |
| 2005/0014464 | A1* | 1/2005 | Larsson ....................... 455/11.1 |
| 2007/0041429 | A1* | 2/2007 | Khandekar ................... 375/146 |

FOREIGN PATENT DOCUMENTS

KR 1020040018525 3/2004

* cited by examiner

*Primary Examiner* — Kwang B Yao
*Assistant Examiner* — Anh Ngoc Nguyen
(74) *Attorney, Agent, or Firm* — The Farrell Law Firm, P.C.

(57) ABSTRACT

A method and system for selecting an RS in an MS in a communication system are provided, in which the MS measures channel qualities between the MS and at least two RSs, and selects an RS for relaying signals between the MS and a BS from among the at least two RSs according to the channel quality measurements.

12 Claims, 8 Drawing Sheets

METHOD AND SYSTEM FOR SELECTING RELAY STATION IN A COMMUNICATION SYSTEM

PRIORITY

This application claims priority under 35 U.S.C. §119(a) to a Korean Patent Application filed in the Korean Intellectual Property Office on Aug. 31, 2006 and assigned Serial No. 2006-83458, the disclosure of which is incorporated herein by reference.

BACKGROUND OF THE INVENTION

1. Field of the Invention

The present invention generally relates to a communication system, and more particularly to a method and system for selecting a Relay Station (RS) in a multi-hop communication system.

2. Description of the Related Art

Provisioning of high-speed large data transmission/reception services to Mobile Stations (MSs) is an active study area in future-generation communication systems. Increasing system capacity through multi-hop relaying is under serious consideration. Herein, a communication system using a multi-hop scheme is referred to as multi-hop communication system.

In the multi-hop communication system, when the channel status between a Base Station (BS) and an MS is poor, an RS residing between the BS and the MS relays signals between them. As the MS transmits/receives signals on the best channel provided by the BS and the MS, its capacity increases, resulting in increased system capacity.

If one of the channels between BS and the RS and between the RS and the MS is bad, it may be better to communicate without involving the RS. Also, communication without relying on the RS is preferable when the channel status between the RS and the MS is bad, despite having a good channel between the BS and the RS.

Accordingly, there exists a need for specifying a procedure for selecting an RS in a good channel status in order to enable high-speed large data transmission/reception and increased system capacity.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a method and system for selecting an RS in a communication system.

Another aspect of the present invention is to provide a method and system for transmitting information about a selected RS in a communication system.

In accordance with an aspect of the present invention, there is provided a method for selecting an RS in an MS in a communication system, in which the MS measures channel qualities between the MS and at least two RSs and selects an RS for relaying signals between the MS and a BS from among the at least two RSs according to the channel quality measurements.

In accordance with another aspect of the present invention, there is provided a communication system for selecting an RS, which includes an MS and an RS for relaying signals between the MS an a BS. The MS measures channel qualities between the MS and at least two RSs, and selects an RS for relaying signals between the MS and the BS from among the at least two RSs according to the channel quality measurements.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF THE PREFERRED EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a method and system for selecting an RS that will relay signals in a multi-hop communication system. While the RS selection method and system according to the present invention are described in the context of examples, it is to be clearly understood that they are also applicable to other communication systems.

The present invention provides an operation for selecting an RS in a good channel status among from a plurality of RSs and its associated operation, for more efficient signal relaying in a multi-hop communication system. Assuming that two RSs reside between a BS and an MS, the present invention provides a method and system for selecting an RS in the better channel status between the two RSs. Obviously, the RS selection method and system are also applicable for more RSs.

Figure 1:
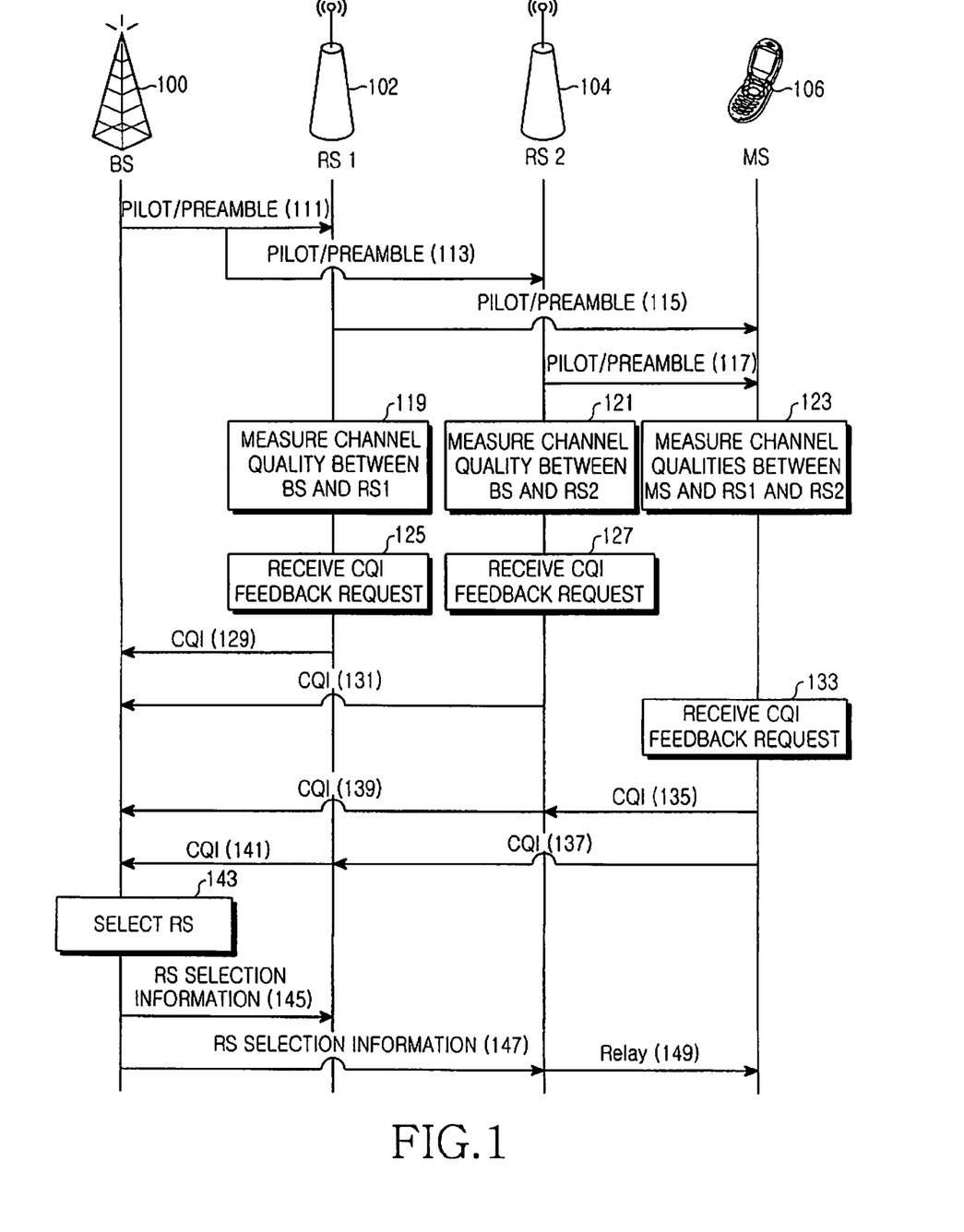
FIG. 1 illustrates a signal flow for an RS selection procedure in a multi-hop communication system according to an exemplary embodiment of the present invention.

With reference to FIG. 1, an RS selection procedure in a multi-hop communication system according to an exemplary embodiment of the present invention is described. FIG. 1 illustrates a signal flow for an RS selection procedure in a multi-hop communication system according to an exemplary embodiment of the present invention. In the illustrated case of FIG. 1, an RS having a better channel status is selected between first and second RSs 102 and 104, taking into account channel qualities between a BS 100 and the RSs 102 and 104 and channel qualities between an MS 106 and RSs 102 and 104.

Referring to FIG. 1, BS 100 transmits a reference channel signal to first RS 102 in step 111 and to second RS 104 in step 113. The reference channel signal is a pilot or preamble signal, for example. Thus, the first and second RSs 102 and 104 receive the reference channel signal and transmit the reference channel signal to MS 106 in steps 115 and 117, respectively.

In steps 119 and 121, first and second RSs 102 and 104 measure channel qualities between BS 100 and RSs 102 and 104, respectively, using the reference channel signal. The channel qualities are assessed by Carrier-to-Interference and Noise Ratio (CINR), Received Signal Strength Indication (RSSI), or Signal-to-Interference and Noise Ratio (SINR). CINR is discussed herein, for purposes of providing an example. After measuring the CINRs of the reference channel signal, first and second RSs 102 and 104 generate Channel Quality Information (CQIs) corresponding to the CINR measurements. Meanwhile, MS 106 measures channel qualities between first RS 102 and MS 106 and between second RS 104 and MS 106 using the received reference channel signals, and accordingly generates CQIs in step 123.

Upon request of BS 100 for CQI feedback in steps 125 and 127, RSs 102 and 104 transmit the CQIs to BS 100 in steps 129 and 131. When MS 106 receives a CQI feedback request from BS 100 in step 133, MS 106 also transmits the CQIs to RSs 102 and 104 in steps 135 and 137. RSs 102 and 104 transmit the received CQIs to BS 100 in steps 139 and 141.

The BS 100 selects an RS to relay signals using the received CQIs representing the channel qualities between BS 100 and RSs 102 and 104, and between MS 106 and RSs 102 and 104 according to the following Equation (1).

$$RS_m^0 = \arg\max_{i} f(g(BS, RS_i), g(RS_i, MS_i)) \quad (1)$$

where $g(BS,RS_i),g(RS_i,MS_i)$ denotes the CQIs between the BS and an RS and between the RS and the MS, and f(a,b) denotes a criterion for selecting an RS a and b are input. The criterion may use data rate, transmission error rate, average Signal-to-Noise Ratio (SNR), or minimum SNR. It is assumed herein that second RS 104 has a higher RS selection criterion value than first RS 102.

Therefore, BS 100 selects second RS 104 through which to communicate with MS 106 in step 143. In steps 145 and 147, BS 100 broadcasts RS selection information about the selected RS 102 to RSs 102 and 104. RSs 102 and 104 check whether the RS selection information includes their Identifications (IDs). Determining the absence of its ID, first RS 102 neglects the RS selection information, whereas second RS 104 relays the RS selection information to MS 106, being aware of the presence of its ID in the RS selection information in step 149.

In accordance with the above-described exemplary embodiment of the present invention, a BS selects an RS in the best channel status, taking into account all channel qualities between the BS and RSs, and between RSs and an MS. If the channel quality between the BS and the RS is good but the channel quality between the RS and the MS is bad, or vice versa, overall communication status is bad. Accordingly, the BS considers overall channel quality reflecting BS-RS and RS-MS channel qualities, or the loads of channels in selecting an RS to relay signals.

Since the RS selection and RS information delivery involves many message transmissions/receptions, there may be an increase in communication delay. In addition, many CQI reports also increase the amount of feedback, resulting in less actual data being transmitted/received.

With this context, a method for selecting an RS by an MS so as to minimize the RS selection delay and the feedback amount is provided in second and third exemplary embodiments of the present invention.

The second and third exemplary embodiments of the present invention are based on the following prerequisites.

(1) The channel quality between a BS and an RS is good (fixed relay). In general, only if the channel qualities both between the BS and the RS and between the RS and an MS are good, relaying is effective. If either of the channel qualities is bad, direct signal transmission/reception between the BS and the MS may be preferred to relayed signal transmission/reception between them. When an RS is fixed in position, the RS is usually installed at a position that offers a good channel environment. Hence, the channel between the BS and the RS is assumed to be in a good status.

(2) The MS is responsible for selecting an RS in order to overcome the problem of an increase in delay and amount of feedback encountered with the first exemplary embodiment of the present invention in which the BS selects an RS.

A procedure for selecting an RS by an MS in the multi-hop communication system according to the second and third exemplary embodiment of the present invention is described with reference to FIG. 2, which illustrates a signal flow for an RS selection procedure in the multi-hop communication system. In the RS selection procedure, the MS selects an RS and performs a verification procedure in relation to the selected RS. It is assumed that different RSs use different bandwidth request sequence indexes and the same CQI codebook.

Figure 2:
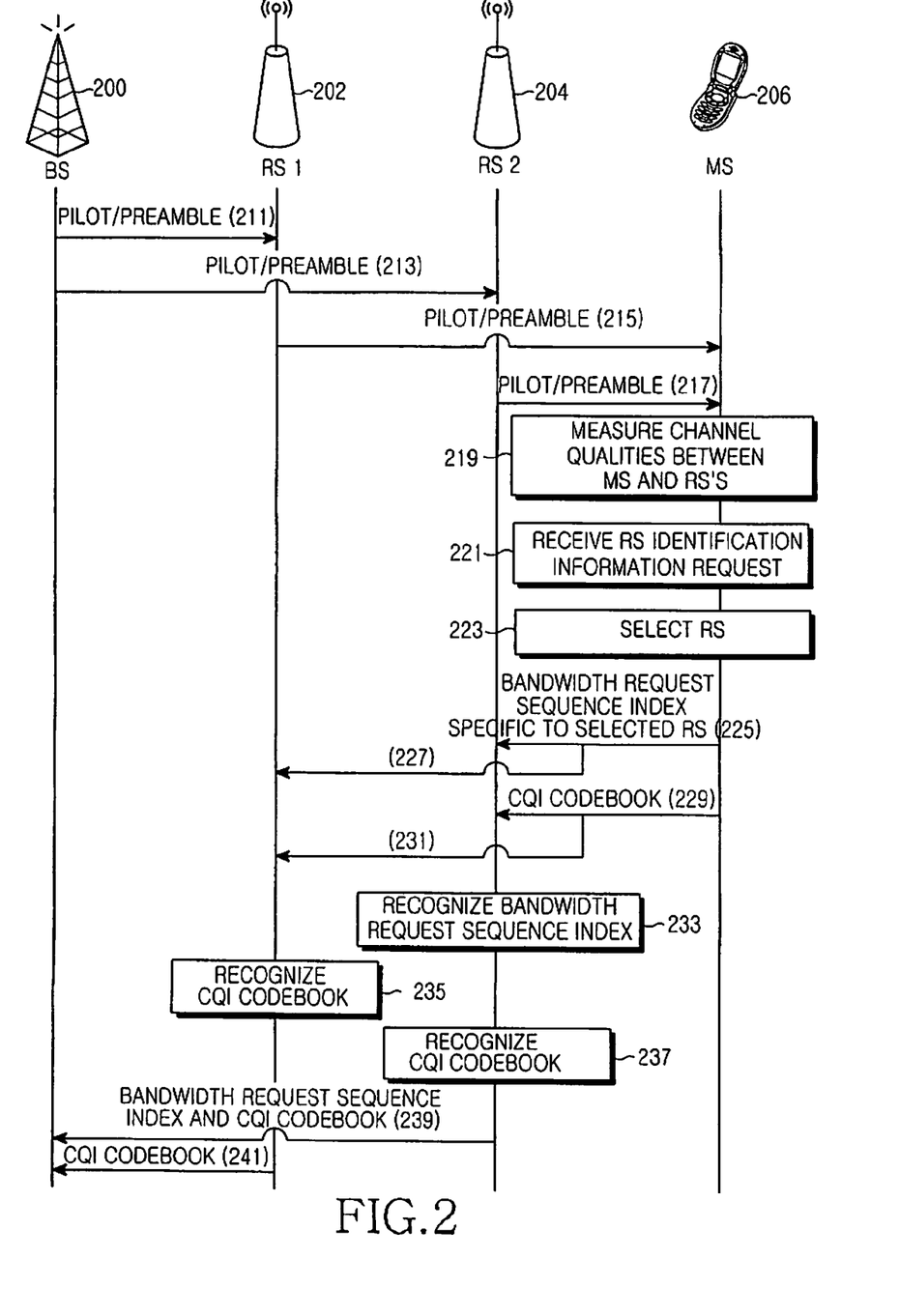
FIG. 2 illustrates a signal flow for an RS selection procedure in the multi-hop communication system according to another exemplary embodiment of the present invention.

Referring to FIG. 2, a BS 200 transmits a reference channel signal to first and second RSs 202 and 204 in steps 211 and 213. The reference channel signal is a pilot/preamble signal, for example. First and second RSs 202 and 204 receive the reference channel signal from BS 200 and relay their received reference channel signals to an MS 206 in steps 215 and 217. MS 206 measures channel qualities between MS 206 and RSs 202 and 204 using the received reference channel signals in step 219. The channel qualities are measured in CINR, RSSI, or SINR, with CINR described herein for example. MS 206 then generates CQIs corresponding to the CINR measurements. In step 223, MS 206 selects an RS having a better channel quality between RSs 202 and 204. Upon request of BS 200 for identification information about the selected RS, for example, a CQI codebook or a bandwidth request sequence index for the selected RS, or when MS 206 determines to transmit/receive a signal in step 221, MS 206 transmits information about the selected RS to BS 200. In accordance with the exemplary embodiment of the present invention, since second RS 204 is superior to first RS 202 in channel quality, MS 206 determines to transmit/receive signals through relaying of second RS 204. Hence, MS 206 transmits the bandwidth request sequence index of the second RS 204 to the first and second RSs 202 and 204 in steps 225 and 227. In steps 229 and 231, MS 206 transmits a CQI codebook common to all RSs to first and second RSs 202 and 204.

First and second RSs 202 and 204 determine whether the received bandwidth request sequence index is identical to their bandwidth request sequence indexes. As MS 206 has selected the second RS 204, in this example MS 204 has transmitted the bandwidth request sequence index of the second RS 204. Thus, second RS 204 is aware that the received bandwidth request sequence index is identical to that of second RS 204 in step 233. Also, first and second RSs 202 and 204 compare the received CQI codebook with their CQI codebooks. Because a CQI of the same codebook is transmitted in the second exemplary embodiment of the present invention, RSs 202 and 204 recognize the CQI codebook in steps 235 and 237. The second RS 204 feeds back the received bandwidth request sequence index and CQI codebook to BS 200 in step 239, while first RS 202 feeds back the CQI codebook to BS 200 in step 241. The CQI codebook feedback and the bandwidth request sequence index transmission may differ in transmission, time and number of transmissions, and these two operations may be performed independently.

Table 1 below lists different bandwidth request sequence indexes allocated to different RSs.

TABLE 1

| RS index | BW request sequences (Index of Gold code length 127) |
|---|---|
| RS 1 | 0~31 |
| RS 2 | 32~63 |
| RS 3 | 64~95 |
| RS 4 | 96~127 |

Given a total of 128 bandwidth request sequence indexes 0 to 127 in a communication system, as listed in Table 1, indexes 0 to 31 are allocated to first RS, indexes 32 to 63 are allocated to Second RS, indexes 64 to 95 are allocated to third RS, and indexes 96 to 127 are allocated to forth RS. In the present invention, only first RS and second RS are dealt with.

As described above, MS 206 measures the channel qualities between the RSs 202 and 204, and MS 206 determines that the channel quality between MS 206 and the second RS 204 is better than that between MS 206 and the first RS 202. Accordingly, MS 206 decides to transmit/receive signals to/from the second RS 204. Then MS 206 selects one of bandwidth request sequence indexes 32 to 63 and feeds it back to BS 200.

Upon receipt of the bandwidth request sequence index, first and second RSs 202 and 204 compare the received bandwidth request sequence index with their bandwidth request sequence indexes. Thus, only the second RS 204 recognizes the received bandwidth request sequence index.

Figure 3:
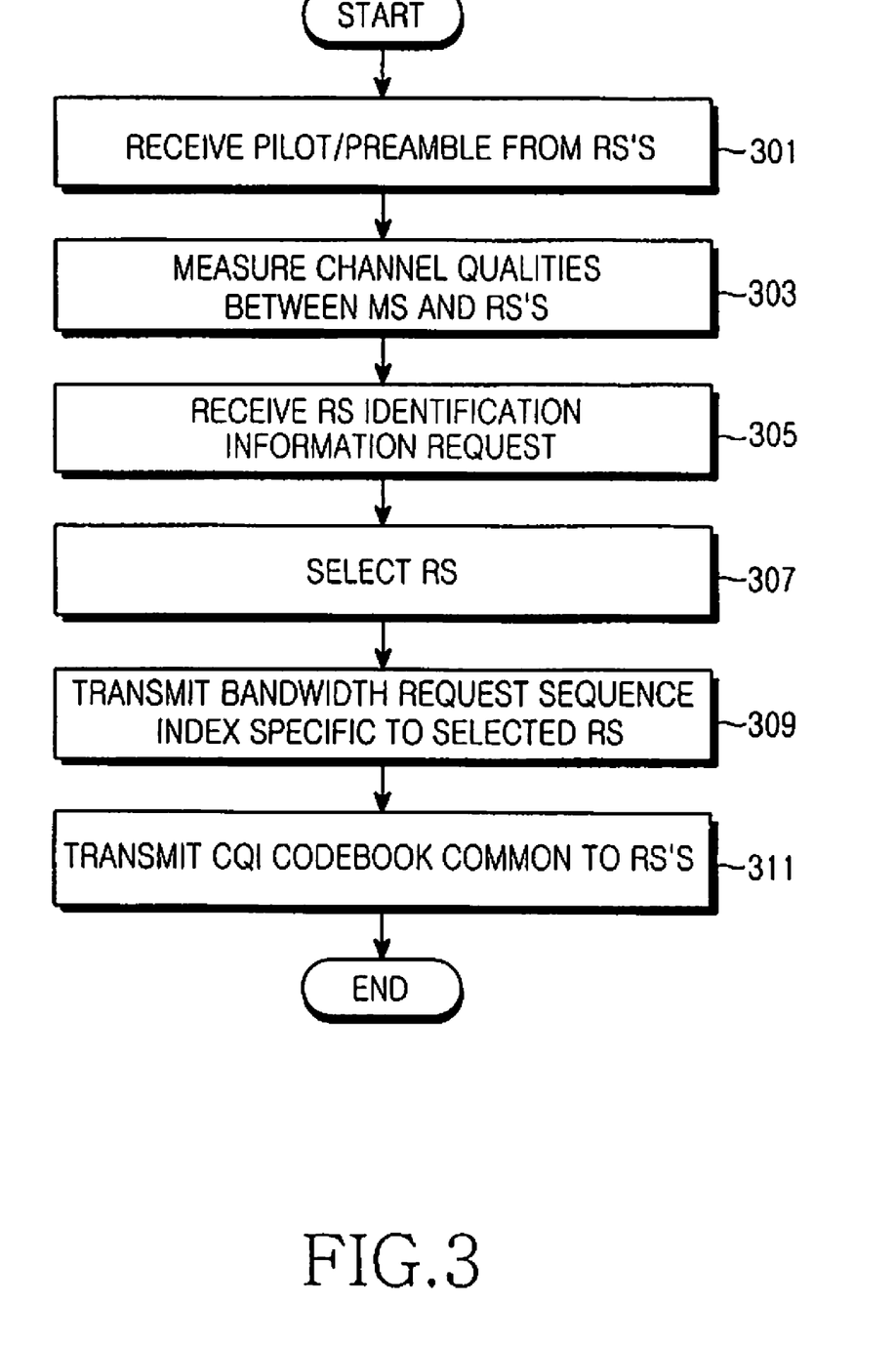
FIG. 3 is a flowchart illustrating the operation of the MS illustrated in FIG. 2.

FIG. 3 is a flowchart illustrating the operation of the MS 206. Referring to FIG. 3, MS 206 receives pilot/preamble signals from RSs 202 and 204 in step 301. MS 206 measures channel qualities between MS 206 and RSs 202 and 204 using the pilot/preamble signals in step 303. In step 305, MS 206 receives a request for feedback of identification information of a selected RS, for example, a CQI codebook/bandwidth request sequence index of the selected RS from BS 200 or determines to transmit/receive a signal. MS 206 then selects an RS for relaying signals in step 307 and transmits a bandwidth request sequence index of the selected RS to RSs 202 and 204 in step 309. In step 311, MS 206 transmits a CQI codebook common to RSs 202 and 204 to them and ends the procedure.

Figure 4:
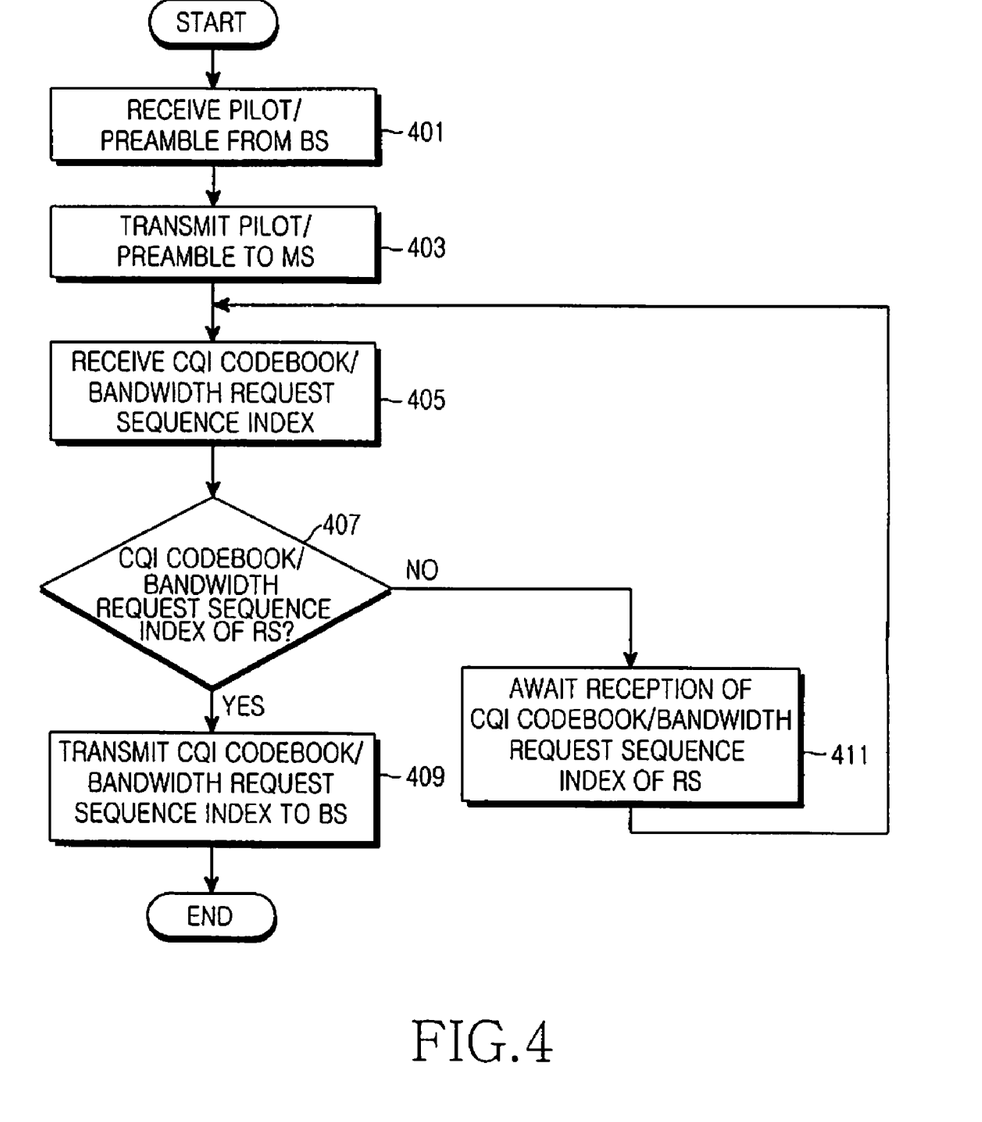
FIG. 4 is a flowchart illustrating the operation of RSs illustrated in FIG. 2.

FIG. 4 is a flowchart illustrating the operation of the RSs 202 and 204. Referring to FIG. 4, each of RSs 202 and 204 receives a pilot/preamble signal from BS 200 in step 401 and transmits the pilot/preamble signal to MS 206 in step 403. In step 405, the RSs 202 and 204 receives a bandwidth request sequence index and a CQI codebook from the MS 206. The RSs 202 and 204 compares the bandwidth request sequence index and the CQI codebook with its bandwidth request sequence indexes and CQI codebook in step 407. If at least one of the bandwidth request sequence index and the CQI codebook belongs to the RSs 202 and 204, the RSs 202 and 204 transmits the at least one of the bandwidth request sequence index and the CQI codebook to BS 200 in step 409 and ends the procedure. If either of the bandwidth request sequence index and the CQI codebook does not belong to the RS, the RS waits until it receives its bandwidth request sequence index and CQI codebook in step 411.

While not shown, the criterion on which the MS selects an RS in the second exemplary embodiment of the present invention is expressed in Equation (2):

$$RS_m^0 = \underset{i}{\mathrm{argmax}}\ g(RS_i, MS_i) \tag{2}$$

where $RS_m^0$ denotes an RS with the best channel quality g with respect to an $i^{th}$ MS among a $0^{th}$ RS to an $m^{th}$ RS.

In accordance with the second exemplary embodiment of the present invention as described above, the MS selects an RS based on reference channel signals received from the BS via RSs and transmits a message including a bandwidth request sequence index of the selected RS to the RSs. The individual RSs compare the bandwidth request sequence index with their bandwidth request sequence indexes and the selected RS recognizes that it has been selected as the bandwidth request sequence index belongs to the RS.

In a third exemplary embodiment of the present invention the MS is responsible for selecting an RS for signal relaying and transmits a bandwidth request sequence index common to all RSs and a CQI codebook specific to the selected RS as identification information of the RS.

Figure 5:
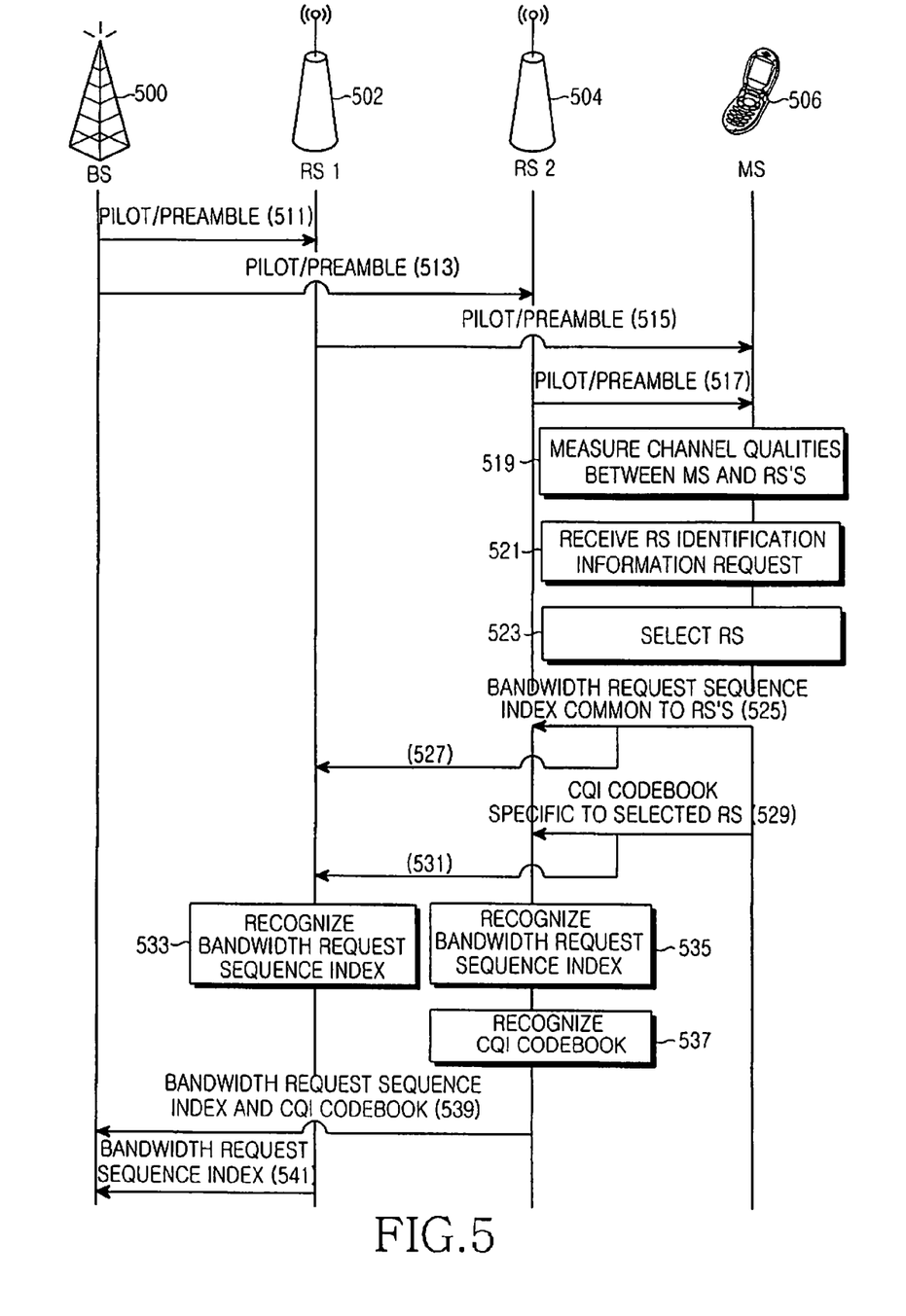
FIG. 5 illustrates a signal flow for an RS selection procedure in the multi-hop communication system according to a third exemplary embodiment of the present invention.

FIG. 5 illustrates a signal flow for an RS selection procedure in the multi-hop communication system according to the third exemplary embodiment of the present invention. In FIG. 5, different RSs use different CQI codebooks and the same bandwidth request sequence index.

Referring to FIG. 5, a BS 500 transmits the same reference channel signal to first and second RSs 502 and 504 in steps 511 and 513. The reference channel signal is a pilot/preamble signal, for example. First and second RSs 502 and 504 transmit their received reference channel signals to an MS 506 in steps 515 and 517, respectively. In step 519, MS 506 measures channel qualities between MS 506 and individual RSs 502 and 504. The channel qualities are measured in CINR, RSSI, or SINR CINR is discussed herein, to provide an example. The MS 506 generates CQIs corresponding to the CINR measurements and selects an RS with the better CQI for signal relaying in step 523. It is assumed that second RS 504 has a better CQI than first RS 502. Upon receipt of a request for identification information about the selected RS, for example, a CQI codebook or a bandwidth request sequence index of the selected RS from BS 500, or when MS 506 determines to transmit/receive a signal in step 521, MS 506 transmits the information about the selected RS to the BS 500. In steps 525 and 527, MS 506 transmits to the RSs 502 and 504 the bandwidth request sequence index common to them. MS 506 also transmits a CQI codebook specific to selected RS to the RSs 502 and 504 in steps 529 and 531.

RSs 502 and 504 compare the received bandwidth request sequence index with their bandwidth request sequence indexes. Since MS 506 transmits the same bandwidth request sequence index, RSs 502 and 504 detect the bandwidth request sequence index in steps 533 and 535. Also, RSs 502 and 504 compare with the received CQI codebook with their CQI codebooks. In step 537, only the second RS 504 identifies that the received CQI codebook is identical to its CQI codebook. Therefore, the second RS 504 feeds back the bandwidth request sequence index and the CQI codebook to the BS 500 in step 539, whereas the first RS 502 feeds back the bandwidth request sequence index to the BS 500 in step 541.

Figure 6:
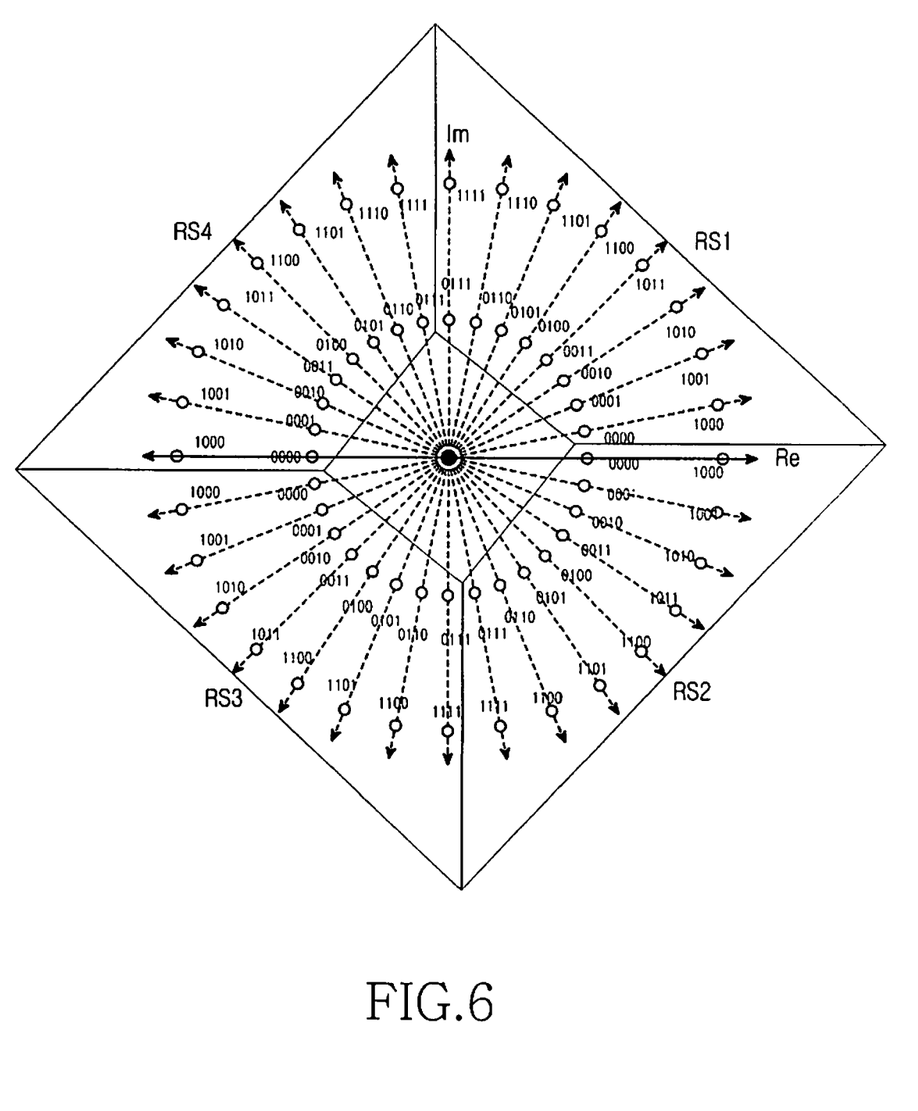
FIG. 6 illustrates different CQI codebooks allocated to different RSs.

FIG. 6 illustrates different CQI codebooks to different RSs. Given four CQI codebooks in the communication system, MS 506 measures channel qualities between the MS 506 and the individual RSs 502 and 504 in the procedure illustrated in FIG. 5. As the second RS 504 has a better channel quality than the first RS 502, MS 506 transmits a CQI codebook of second RS 504 to RSs 502 and 504. RSs 502 and 504 compare the received CQI codebook with their specific CQI codebooks and only the second RS 504 identifies that the received CQI codebook is its CQI codebook.

Figure 7:
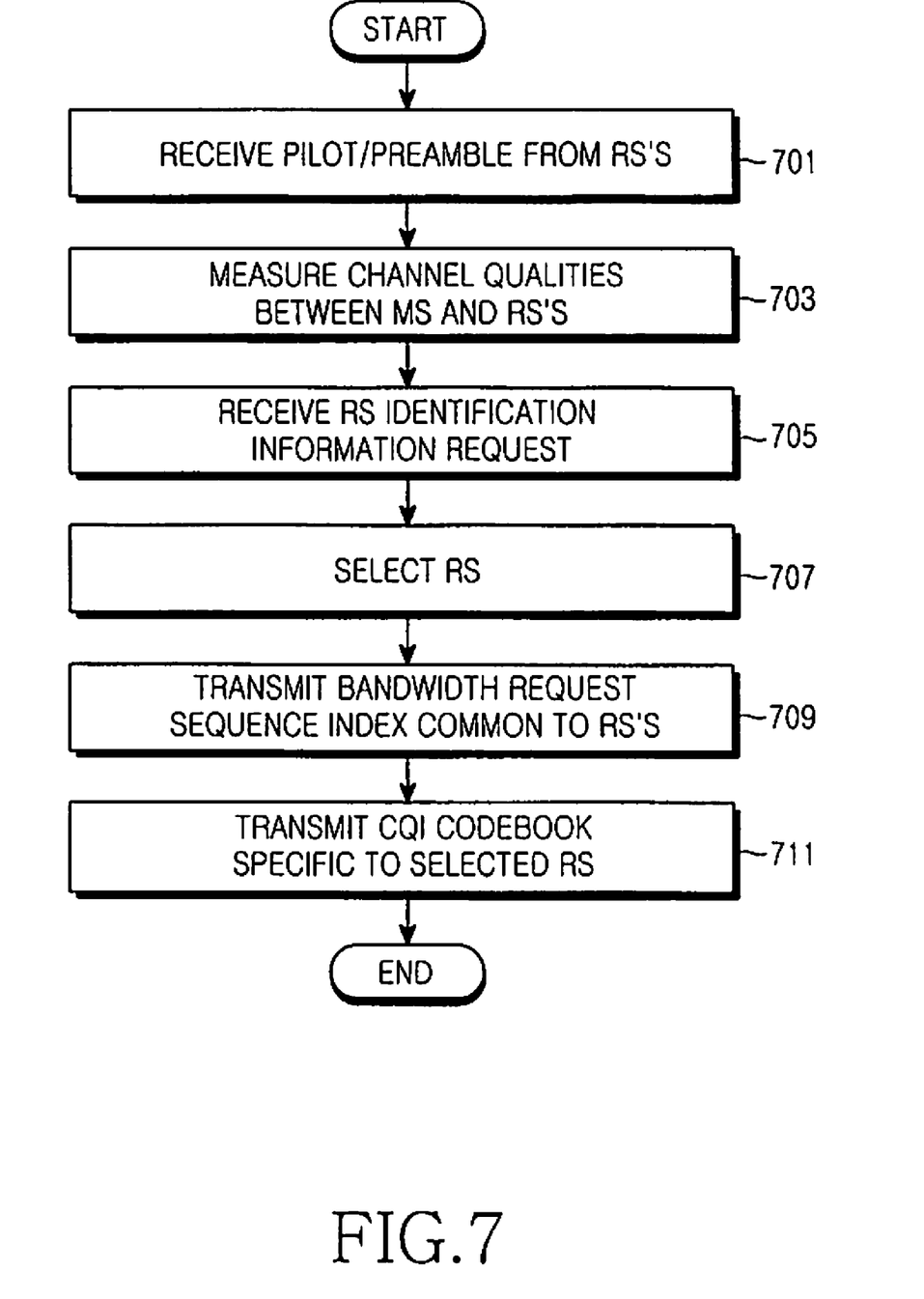
FIG. 7 is a flowchart illustrating the operation of the MS illustrated in FIG. 5.

FIG. 7 is a flowchart illustrating the operation of MS 506. Referring to FIG. 7, MS 506 receives pilot/preamble signals from RSs 502 and 504 in step 701 and measures channel qualities between MS 506 and RSs 502 and 504 in step 703. Upon request for identification information about a selected RS, for example, a CQI codebook/bandwidth request sequence index of the selected RS from BS 500 or in the presence of data to transmit or receive in step 705, MS 506 selects an RS for signal relaying in step 707 and transmits the same bandwidth request sequence index to RSs 502 and 504 in step 709. In step 711, MS 506 transmits a CQI codebook of the selected RS to RSs 502 and 504. Then, MS 506 ends the procedure.

Figure 8:
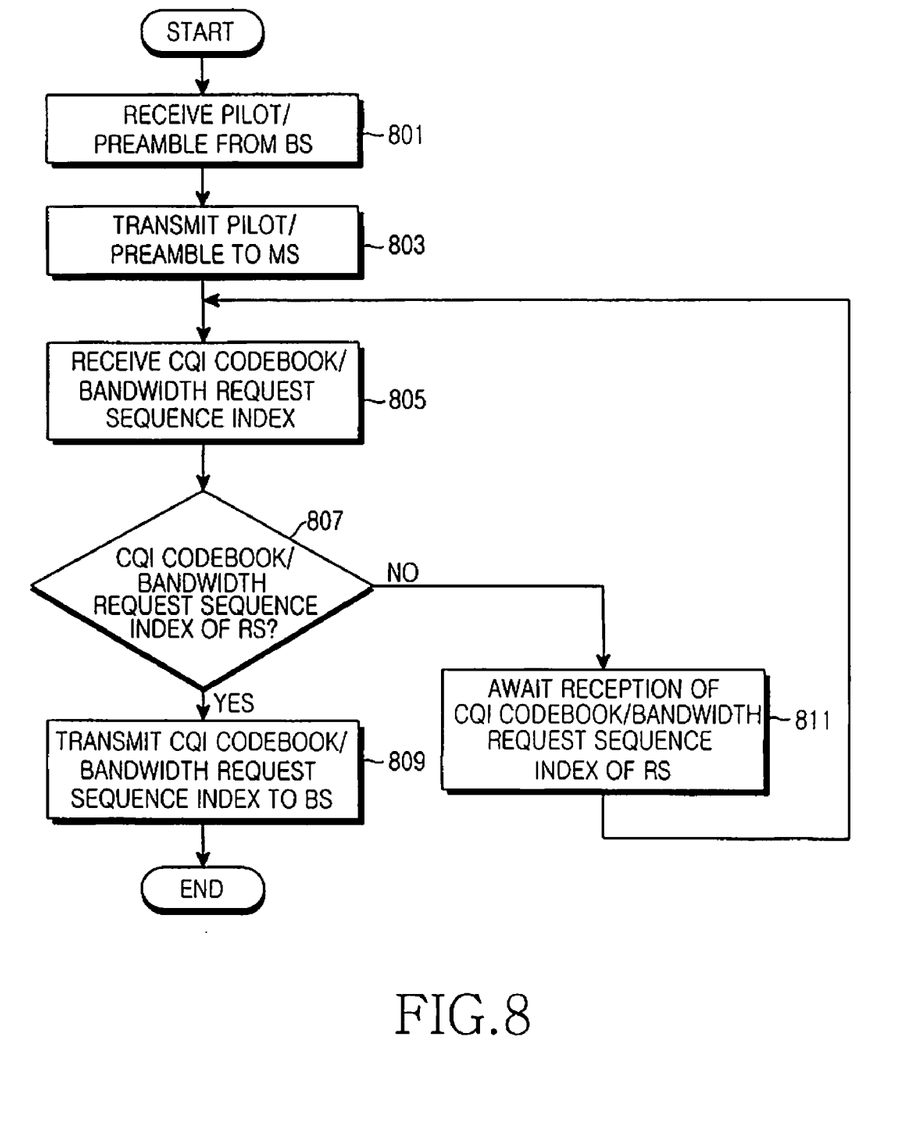
FIG. 8 is a flowchart illustrating the operation of RSs illustrated in FIG. 5.

FIG. 8 is a flowchart illustrating the operation of RSs 502 and 504 illustrated in FIG. 5. Referring to FIG. 8, each of RSs 502 and 504 receives a pilot/preamble signal from BS 500 in step 801 and transmits the pilot/preamble signal to MS 506 in step 803. In step 805, the RSs 502 and 504 receives a bandwidth request sequence index and a CQI codebook from MS 506. The RSs 502 and 504 compares the bandwidth request sequence index and the CQI codebook with its bandwidth request sequence indexes and CQI codebook in step 807. If at least one of the bandwidth request sequence index and the CQI codebook belongs to the RSs 502 and 504, the RSs 502 and 504 transmits the at least one of the bandwidth request sequence index and the CQI codebook to BS 500 in step 809 and ends the procedure. If either of the bandwidth request sequence index and the CQI codebook does not belong to the RS, the RS waits until it receives its bandwidth request sequence index and CQI codebook in step 811.

The criterion on which the MS selects an RS in the third exemplary embodiment of the present invention is expressed as Equation (3):

$$RS_m^0 = \underset{i}{\operatorname{argmax}}\, g(RS_i, MS_i) \quad (3)$$

where $RS_m^0$ denotes an RS with the best channel quality g with respect to an $i^{th}$ MS among a $0^{th}$ RS to an $m^{th}$ RS.

As is apparent from the above description, the present invention advantageously minimizes an RS selection delay and feedback amount by specifying a procedure for selecting an RS that will relay signals between a BS and an MS in a communication system.

While the invention has been shown and described with reference to certain exemplary embodiments of the present invention thereof, it will be understood by those skilled in the art that various changes in form and details may be made therein without departing from the spirit and scope of the present invention, as defined by the appended claims and their equivalents.

What is claimed is:

1. A method for selecting a Relay Station (RS) by a Mobile Station (MS) in a communication system, comprising:
   measuring, by the MS, channel qualities between the MS and at least two RSs;
   selecting, by the MS, an RS for relaying signals between the MS and a Base Station (BS) from among the at least two RSs based on information about the measured channel qualities; and
   transmitting, by the MS, identification information about the selected RS to the at least two RSs, upon receiving an identification information request for the selected RS from the BS,
   wherein the identification information includes one of bandwidth request sequence indexes included in a bandwidth request sequence index set for the selected RS, and a Channel Quality Information (CQI) codebook for the selected RS, and
   wherein bandwidth request sequence index sets for the at least two RSs are the same and CQI codebooks for the at least two RSs are different, or the bandwidth request sequence index sets for the at least two RSs are different and the CQI codebooks for the at least two RSs are the same.

2. The method of claim 1, wherein measuring, by the MS, channel qualities comprises measuring the channel qualities between the MS and the at least two RSs, using at least one of pilot signals and preamble signals transmitted from the at least two RSs.

3. The method of claim 1, wherein the bandwidth request sequence index is specific to the selected RS.

4. The method of claim 1, further comprising: performing a signal transmission and reception with the BS via the RS using the bandwidth request sequence index set including the transmitted bandwidth request sequence index, and a CQI codebook corresponding to the transmitted CQI codebook.

5. A Mobile Station (MS) for selecting a Relay Station (RS) in a communication system, comprising:
   a controller for measuring channel qualities between the MS and at least two RSs, and selecting an RS for relaying signals between the MS and the BS from among the at least two RSs based on information about the measured channel qualities; and
   a transmitter for transmitting identification information about the selected RS to the at least two RSs, upon receiving an identification information request for the selected RS from the BS is needed,
   wherein the identification information includes one of bandwidth request sequence indexs included in a bandwidth request sequence index set for the selected RS, and a Channel Quality Information (CQI) codebook for the selected RS, and
   wherein bandwidth request sequence index sets for the at least two RSs are the same and CQI codebooks for the at least two RSs are different, or the bandwidth request sequence index sets for the at least two RSs are different and the CQI codebooks for the at least two RSs are the same.

6. The MS of claim 5, wherein the MS measures the channel qualities between the MS and the at least two RSs, using at least one of pilot signals and preamble signals transmitted from the at least two RSs.

7. The MS of claim 5, wherein the bandwidth request sequence index is specific to the selected RS.

8. The MS of claim 5, wherein the controller performs a signal transmission and reception with the BS via the RS using the bandwidth request sequence index set including the transmitted bandwidth request sequence index, and a CQI codebook corresponding to the transmitted CQI codebook CQI.

9. A method for relaying a signal by a Relay Station (RS) in a communication system, comprising: receiving at least one of pilot signals and preamble signals from a Base Station (BS); transmitting at least one of the pilot signals and the preamble signals to a Mobile Station (MS); receiving a bandwidth request sequence index and a Channel Quality Information (CQI) codebook from the MS;

determining whether a bandwidth request sequence index set for the RS includes the received bandwidth request sequence index, and a CQI codebook for the RS corresponds to the received CQI codebook; and relaying signals between the MS and the BS according to a determined result, wherein the bandwidth request sequence index set for the RS is different from a the bandwidth request sequence index set for each of at least two different RSs and the CQI codebook for the RS is the same as a CQI codebook for each of the at least two different RSs, or the bandwidth request sequence index set for the RS is the same as the bandwidth request sequence index set for each of the at least two different RSs and the CQI codebook for the RS is different from the CQI codebook for each of the at least two different RSs.

10. The method of claim 9, wherein relaying signals between the MS and the BS according to the determined result comprises:

if the bandwidth request sequence index set for the RS includes the received bandwidth request sequence index, and the CQI codebook for the RS corresponds to the received CQI codebook, transmitting the bandwidth request sequence index set for the RS and the CQI codebook for the RS; and relaying signals between the MS and the BS.

11. A Relay Station (RS) for relaying a signal in a communication system, comprising: a receiver for receiving at least one of pilot signals and preamble signals from a Base Station (BS); a transmitter for transmitting at least one of the pilot signals and the preamble signals to a Mobile Station (MS); and a controller for, upon receiving a bandwidth request sequence index and a Channel Quality Information (CQI) codebook from the MS, determining whether a bandwidth request sequence index set for the RS includes the received bandwidth request sequence index, and a CQI codebook for the RS corresponds to the received CQI codebook, and relaying signals between the MS and the BS according to a determined result, wherein the bandwidth request sequence index set for the RS is different from a the bandwidth request sequence index set for each of at least two different RSs and the CQI codebook for the RS is the same as a CQI codebook for each of the at least two different RSs, or the bandwidth request sequence index set for the RS is the same as the bandwidth request sequence index set for each of the at least two different RSs and the CQI codebook for the RS is different from the CQI codebook for each of the at least two different RSs.

12. The RS of claim 11, wherein the controller, if the bandwidth request sequence index set for the RS includes the received bandwidth request sequence index, and the CQI codebook for the RS corresponds to the received CQI codebook, controls to the transmitter for transmitting the bandwidth request sequence index set for the RS and the CQI codebook for the RS, and relaying signals between the MS and the BS.

* * * * *